United States Patent [19]

Woodward

[11] Patent Number: 5,731,629
[45] Date of Patent: Mar. 24, 1998

[54] PERSONAL MEMORY DEVICES CARRIED BY AN INDIVIDUAL WHICH CAN BE READ AND WRITTEN TO

[75] Inventor: Lloyd Harold Woodward, Dunn Loring, Va.

[73] Assignee: Data-Disk Technology, Inc., Sterling, Va.

[21] Appl. No.: 401,779

[22] Filed: Mar. 10, 1995

[51] Int. Cl.$^6$ ................................................. H01L 23/02
[52] U.S. Cl. .................... 257/679; 257/698; 257/787; 257/741; 174/52.3; 361/820
[58] Field of Search ........................ 235/487, 489, 235/379, 492; 340/706; 395/429, 490, 493; 361/728, 820; 257/698, 690, 787, 788, 741, 772, 773, 679; 174/52.2, 52.3, 52.4

[56] References Cited

U.S. PATENT DOCUMENTS

| | | | |
|---|---|---|---|
| 3,915,294 | 10/1975 | Crosby | 206/38 |
| 4,683,371 | 7/1987 | Drexler | 235/487 |
| 4,755,815 | 7/1988 | Savoyet et al. | 340/825.31 |
| 4,814,594 | 3/1989 | Drexler | 235/487 |
| 4,829,166 | 5/1989 | Froelich | 235/379 |
| 4,829,168 | 5/1989 | Nakahara | 235/489 |
| 4,845,351 | 7/1989 | Hara et al. | 235/492 |
| 4,912,308 | 3/1990 | Takahira | 235/379 |
| 4,922,321 | 5/1990 | Arai et al. | 257/773 |
| 4,993,068 | 2/1991 | Piosenka et al. | 380/23 |
| 5,012,229 | 4/1991 | Lennon et al. | 340/706 |
| 5,045,327 | 9/1991 | Tarlow et al. | 381/51 |
| 5,184,064 | 2/1993 | Vicknair et al. | 324/156 |
| 5,227,614 | 7/1993 | Danielson et al. | 235/380 |
| 5,234,351 | 8/1993 | Dixon | 439/160 |
| 5,266,834 | 11/1993 | Nishi et al. | 257/706 |
| 5,267,218 | 11/1993 | Elbert | 365/226 |
| 5,275,573 | 1/1994 | McCleerey | 439/159 |
| 5,293,424 | 3/1994 | Holtey et al. | 380/23 |
| 5,334,030 | 8/1994 | Brilliott | 439/75 |
| 5,334,046 | 8/1994 | Brouillette et al. | 439/540 |
| 5,337,220 | 8/1994 | Granitz | 361/816 |
| 5,339,222 | 8/1994 | Simmons et al. | 361/818 |
| 5,357,573 | 10/1994 | Walters | 380/25 |
| 5,359,570 | 10/1994 | Hsu et al. | 365/230.01 |
| 5,373,467 | 12/1994 | Wang | 365/189.02 |
| 5,440,451 | 8/1995 | Saito et al. | 361/760 |
| 5,468,947 | 11/1995 | Danielson et al. | 235/472 |
| 5,473,194 | 12/1995 | Kawai et al. | 257/698 |
| 5,532,705 | 7/1996 | Hama | 343/718 |
| 5,554,887 | 9/1996 | Sawai et al. | 257/787 |

FOREIGN PATENT DOCUMENTS 9117542  11/1991  WIPO .

*Primary Examiner*—David L. Robertson
*Attorney, Agent, or Firm*—Pollock, Vande Sande & Priddy

[57] ABSTRACT

A personal data storage device for storing information and a system for storing and reading such information from the storage device. A programmable memory is encapsulated in a potting compound which includes a plurality of channels enclosing leads of the memory package. The channels extend to the outside of the encapsulated memory to permit exterior contact with the memory leads. A conductive sealant placed in the channels for sealing the channels of the encapsulated flash memory makes electrical contact with the leads. A device for reading the information from the data storage device includes a PCMCIA interface which can read and write data to and from the personal data storage device and a computer. The computer further includes programming for compressing and decompressing data which is stored and read from the personal data storage device.

9 Claims, 7 Drawing Sheets

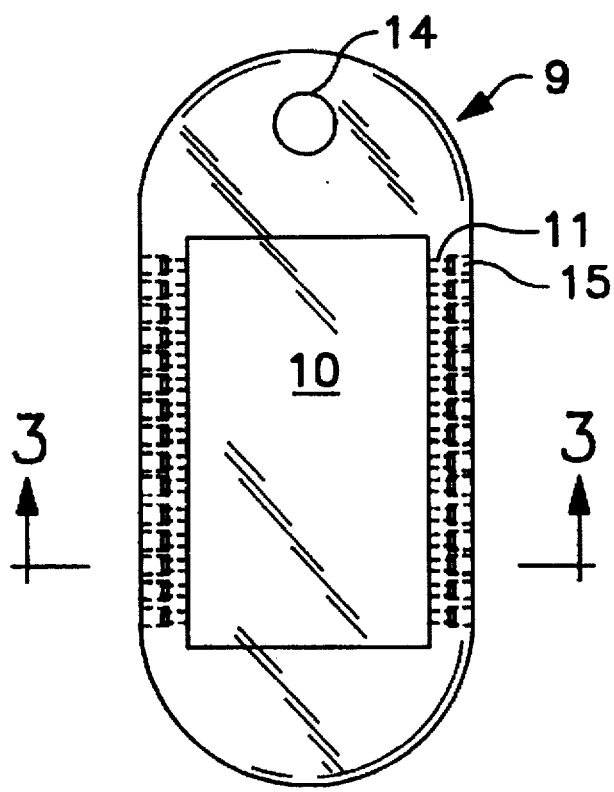
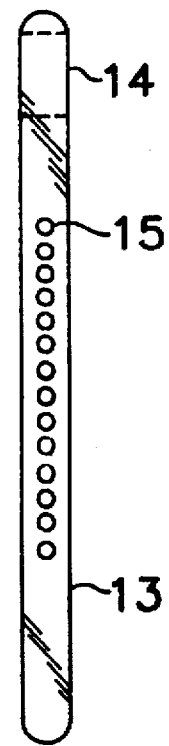
FIG. 1  FIG. 2
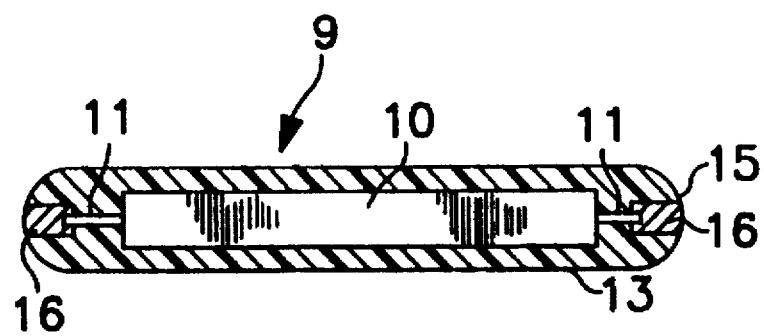
FIG. 3

PERSONAL MEMORY DEVICES CARRIED BY AN INDIVIDUAL WHICH CAN BE READ AND WRITTEN TO

The present invention relates to small memory devices containing important data which can be carried on a person. Specifically, environmentally hardened memories are provided which can contain personal documents relating to an individual and a system for reading and writing data to these personal memory devices is also disclosed.

Microelectronics, because of its increasing circuit density, has been used in many personally carried electronic circuit devices such as calculators, and smart cards used in credit transactions. Each of these microelectronic devices depends upon an ability to store electronic data and to recall the data when the device is used.

Smart card technology which is one of the more recent innovations in high density microelectronics, places a microprocessor on a credit card-sized substrate. The microprocessor is capable of interacting with a reading and writing device, such as an ATM machine. The smart card devices have external connections for permitting data transfer between the microprocessor and the reading device. The smart card technology has encountered problems with durability in a personal environment where they are carried in an individual's wallet or purse, and subject to rigorous use. The external connections for these devices have had a high failure rate in this environment. Moreover, the devices have performance limitations which are based on the size of available memory. Thus, extensive personal records by and large cannot be kept in such devices.

The desirability of having a personal electronic device which stores extensive data records has been recognized in the emergency medical field. To successfully treat a patient, medical history is invaluable and sometimes absolutely necessary for administering proper medical care. Thus, in a scenario where an unexpected injury occurs, through occupational hazards or from the everyday risks of personal injury, the emergency medical personnel need to quickly assess the current condition of the injured person, as well as vital details concerning his medical history. In extreme emergencies, the victims are often not able to communicate such information, and medical procedures are administered without full knowledge of the patient's history.

A device which would carry personal medical records in a convenient but reliable package is very desirable. Thus, such a device, if carried on the victim's person could be conveniently used to alert emergency medical personnel of the victim's medical history.

A memory containing sufficient capacity to store these records must also be durable to withstand the environment encountered when carried on the individual. The conventional disk storage devices, either optical or magnetic, will not meet the rigorous environmental constraints necessary to preserve the data in case of emergency. The smart card technology is also not sufficiently durable to withstand such environmental conditions.

Thus, there is an identifiable need for a personal mass data storage device capable of holding multiple pages of information in an environment which has rendered conventional mass data storage unreliable.

SUMMARY OF THE INVENTION

It is an object of this invention to provide a personal mass storage device which will withstand rigorous use in all environments.

It is yet another object of this invention to provide a personal mass storage device which can be carried on an individual's person containing voluminous personal records.

It is yet another object of this invention to provide a personal mass storage device which can be reliably written to and read from.

It is another object of this invention to provide for a personal mass storage device having reliable connections which will withstand extreme environmental conditions.

These and other objects of the invention are provided for by a memory which is encapsulated by a potting or encapsulating compound. The encapsulating compound includes a plurality of channels which enclose leads of the programmable memory and extend to the outside of the encapsulated memory to permit exterior contact to be made with the leads. The channels are sealed with a conductive sealant which keeps moisture from entering the storage device, as well as permits electrical contact to be made with the leads of the programmable memory device.

In a preferred embodiment of the invention, the personal data storage device includes a programmable flash memory which can be programmed with compressed data to store upwards to 1,000 pages of text, or image data. The potting compound which completely encloses the flash memory has a surface which is continuous with the sealed channels. A through hole located in the potting compound adjacent the enclosed flash memory permits the device to be worn by an individual.

The personal storage device may be read and written to by a pair of connectors which are biased against the connections formed through the channels of the potting compound.

In a preferred embodiment of the invention, a PCMCIA interface is used to transfer compressed data between the personal storage device and the flash memory.

DESCRIPTION OF THE FIGURES

FIG. 1 is a plan view of a personal storage device which includes a flash ROM memory in accordance with a preferred embodiment of the invention.

FIG. 2 is a side view of the personal memory device of FIG. 1.

FIG. 3 is a section view of the personal memory device of FIG. 1.

DESCRIPTION OF THE PREFERRED EMBODIMENT

Figure 4:
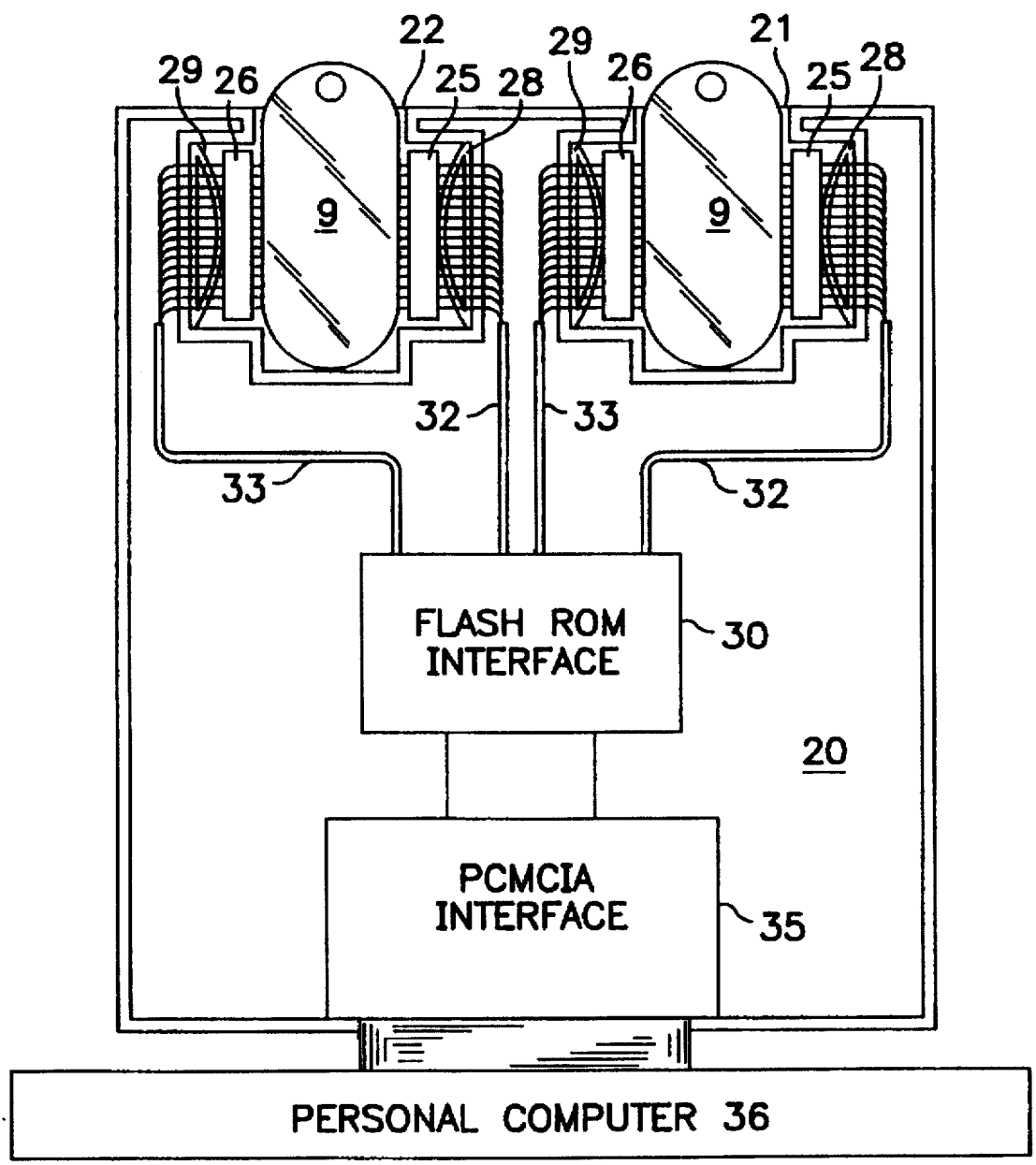
FIG. 4 illustrates a device for transferring data to and from the personal storage device of FIGS. 1 through 3.

Referring now to FIGS. 1 through 3, there is shown various views of a personal mass storage device in accordance with a preferred embodiment of the invention. The personal mass storage device 9 includes a programmable memory 10 which may be a flash ROM encapsulated within a potting compound 13. The flash memory 10 includes a plurality of leads 11 which laterally extend away from the longer edges of the flash ROM 10. The leads 11 terminate within a respective channel 15 formed in the potting/encapsulating compound 13 during encapsulation of the flash ROM 10.

With the exception of the openings formed by channels 15, the flash ROM 10 is completely encapsulated and sealed by the potting compound 13. One edge of the potting compound 13 includes a through hole 14 which may be used to support the personal memory device on a necklace or other support.

Electrical connections are made to the flash ROM 10 through an electrically conductive sealant 16 which is used to seal channels 15. The electrically conductive sealant 16 adheres to the lead 11 and forms on the opposite end thereof a plug or seal for the channel 15 and is ground flush with the surface of the compound 13. The sealant 16 may be an electrically conductive resin.

The potting compound 13 which forms an encapsulation layer for the flash ROM 10 may be selected from any number of urethane resins. The encapsulation is done using any number of prior art molding processes such as injection molding. The urethane resin is selected to have a high flexural modulus so that the resulting encapsulated memory is hardened against its environment. With a high flexural modulus material, the personal memory storage device can be subject to extreme environments without damage to the connections necessary for transferring data to or from the device.

The flash ROM state of the art permits upwards to 1,000 pages of text to be stored in a single flash ROM chip 10. Although the illustrated personal data storage device is shown with a single flash ROM chip 10, multiple flash ROM chips may also be implemented in a larger personal data storage device.

The electrically conductive sealant 16 may also be of a resin type material having similar strength characteristics. The electrical contact structure may be implemented using a conductive epoxy which fills channel 15 and then hardens. The hardened electrically conductive epoxy resin 16 is then lightly sanded with an abrasive such that the contact area is substantially flush with the exterior surface of potting compound 13.

Data may be written to or from the personal data storage device using an interface, as shown in FIG. 4. The interface 20 includes at opposite ends thereof a cavity 21 and 22 for receiving first and second personal data storage devices 9. A pair of identical sets of contacts 25 and 26, having a contact pattern identical to the pattern of connections 16, are located on either side of the cavity 21 and 22. When the personal data storage devices are inserted within cavities 21 and 22, the pair of connectors 25 and 26 have contacts urged into contact with each of the connections 16 formed on the personal data storage device 9 by spring biasing devices 28, 29.

The use of the flash ROM 10 as the memory device within personal data storage device 9 permits a standard flash ROM interface 30 to be connected to each personal data storage device 9 and data transferred over conventional interface circuitry. Each of the connectors 25 and 26 are connected through similar multiple lead conductors 32 and 33 to the flash ROM interface 30.

A PCMCIA interface 35 is shown which can advantageously connect to a conventional bus system of a personal computer 36, such as a 486 based microcomputer system. Thus, the data from a personal computer 36 may be transferred, preferably in a compressed state to maximize use of the data storage within flash ROM 10 to create various personal records for the holder of a personal data storage device.

The personal data storage device, in accordance with FIGS. 1 through 3 is particularly adaptable for containing medical records of the holder of the data storage device 9. If the holder of the device is involved in any serious injury, emergency medical personnel can recover the personal data storage device 9 from the injured person and its contents may be read by a computer connected through interface 20 to the personal data storage device. All relevant information concerning the medical history of the injured victim will be available where it is needed most.

Figure 5:
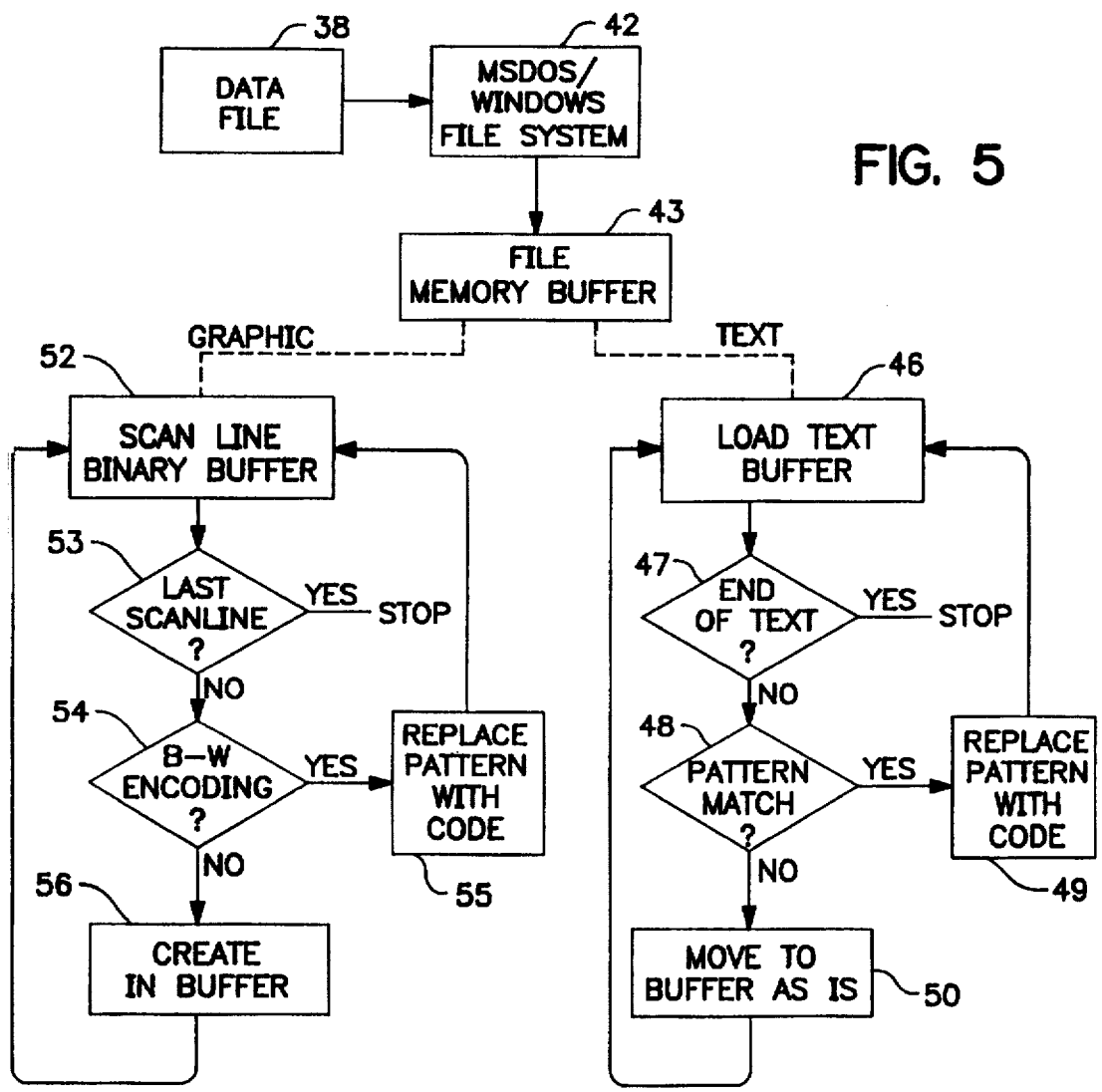
FIG. 5 illustrates the process for compressing either graphic/image data or text data.
Figure 8:
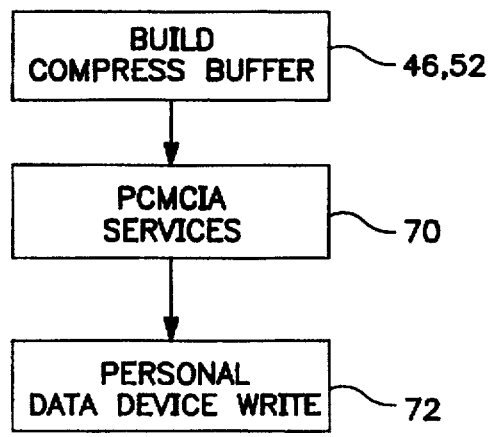
FIG. 8 illustrates the steps for writing data to the personal memory device.

In order to make the maximum use of the data storage provided by the single flash ROM 10, a data compression technique such as is shown in FIG. 5 may be utilized to store compressed data in the personal data storage device 9. The compression steps shown in FIG. 5 are implemented by computer 36 which connects to the interface 20. The compression technique is selected such that the amount of data compression does not unduly increase the time required to read data from the personal data storage device. A deliberate trade off has been made between decompression time and compression density so that valuable time will not be lost in reading the contents of the personal data storage device, particularly under emergency conditions.

Turning specifically to FIG. 5, there is illustrated a data file 38 of computer 36 which contains pages of either text or graphic data for storage in the personal memory device 9. The data file 38 and following execution steps are carried out in a standard INTEL based processing system. An MS/DOS/windows file system 42 is executed in the personal computer 36 to recall the data stored in data file 38 and insert the data in a file memory buffer 43.

The contents of file memory buffer 43 are processed in accordance with steps 46 through 50 if the information is text. Graphic information stored in file memory buffer 43 is processed in accordance with steps 52 through 56.

The compression scheme illustrated in FIG. 5 describes an interactive process wherein the entire contents of the file memory buffer 43 are scanned for sequences of data representing repetitive data patterns. The process begins in step 47 which stops the compression technique when all bytes of the load text buffer have been checked to determine their presence in one or more patterns.

Step 48 represents the determination whether or not consecutive bytes of data within the load text buffer 46 comprise a pattern. In the event that more than one set of consecutive bytes in the load text buffer have the same pattern, the consecutive bytes are replaced by a single character such as a τ or # representing the group of characters. The value of the character is stored in memory so that during a decompression routine, every time the character is encountered in a read operation for recovering data from the personal memory device, the full byte pattern is substituted for the character.

Each byte of the load text buffer 46 is checked to determine whether it belongs in such a pattern. If it does not belong in such a pattern, it remains in the buffer as it is. The effect of the foregoing is to decrease the memory capacity necessary to store the information by replacing repetitive patterns of data with a single character which occupies less memory space than the entire pattern.

The processing of graphic data is similar to the processing of text data. As shown in FIG. 5, the process begins with obtaining a single scan line from the file memory in a binary buffer 52. Each scan line is scanned as a single byte is when text is processed. Step 53 determines when the last of the scan lines has been checked and compression is stopped.

In step 54 a determination is made whether or not each scan line is the same as another scan line. In the event the scan line presents a pattern of data identical to one or more other scan lines, the scan line is replaced with a character representing that pattern. The pattern is stored in a local memory location so that during decompression when the character is encountered in the data, the scan line can be replicated. Scan lines which are not part of any pattern remain in the buffer in step 56.

Figure 6:
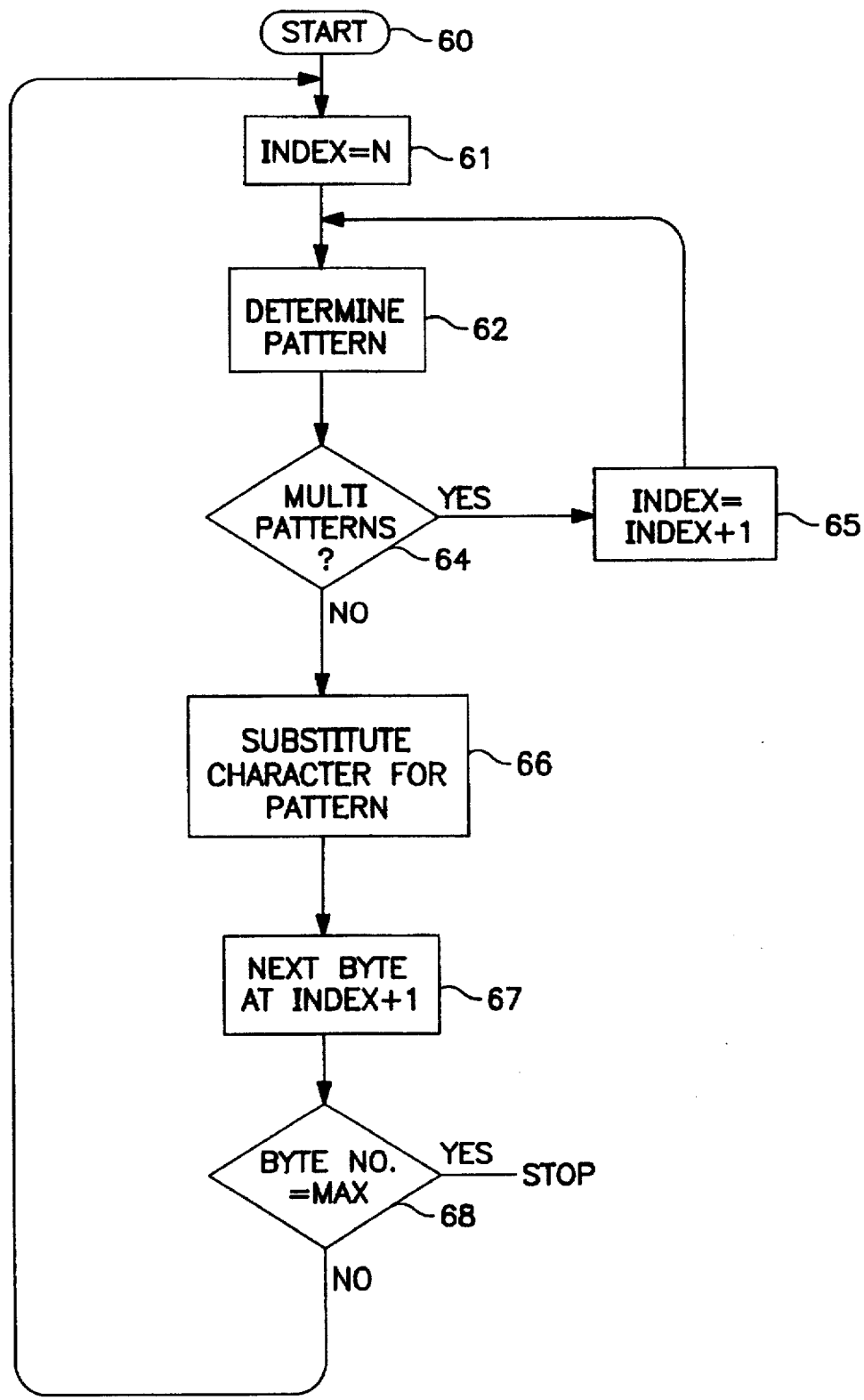
FIG. 6 illustrates the compression process in greater detail.
Figure 7:
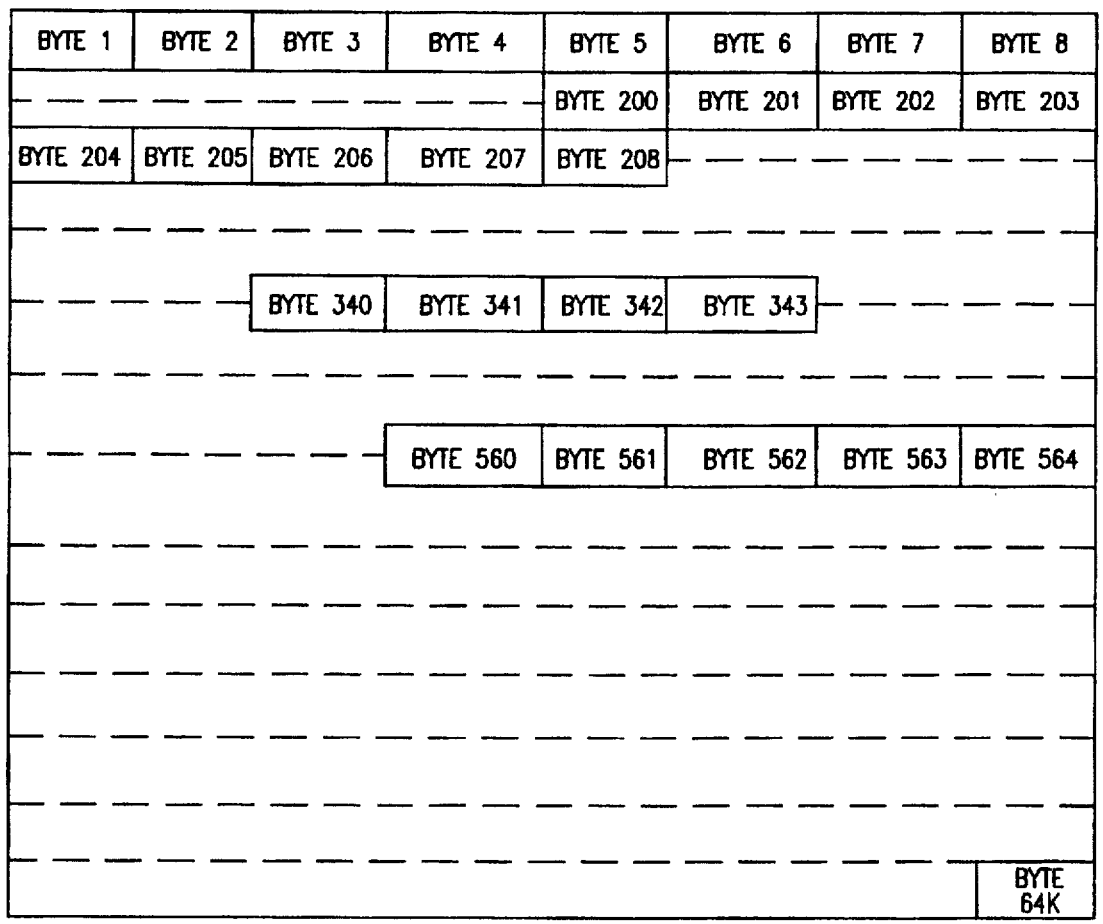
FIG. 7 illustrates the organization of the memory for compressing data.

As a specific example of the compression of text data, FIG. 6 illustrates steps which are executed to determine whether or not consecutive bytes of the text represent a pattern of data to be replaced by a character. The execution steps shown at 60 begin by selecting an index N corresponding to a number of bytes which define a pattern. In the example shown in FIG. 7, wherein 64K bytes of data are to be compressed, N was selected to be 3. In step 62, the first three bytes are compared with every other sequence of three bytes within the 64K memory. In the example of FIG. 7, it is assumed that bytes 201, 202 and 203, 340, 341 and 342, as well as 560, 561 and 562 comprise such a pattern equal to the pattern defined by bytes 1, 2 and 3. In this case, the decision block 64 will increase the index by 1 so that the pattern created by bytes 1 through 4 now becomes compared with the patterns of bytes 201 through 204, 340 through 343 and 560 through 563.

In the event that this next group or set of bytes produces a corresponding pattern, the process continues such that an additional byte is added to the previous set to determine whether a pattern exists.

As soon as the index has been increased to the point where no patterns represented by the new set of data bytes exist, as identified in step 64, the previously identified patterns are replaced in the 64K memory of FIG. 7 with a respective character having less bits than the pattern they replace in step 66. Step 67 identifies the next byte of the next set of bytes checked in accordance with the steps of FIG. 6, which in the example of FIG. 7, is byte 9. The process is then repeated to determine the sets of consecutive bytes which include bytes 9–11. The process of FIG. 6 ends when all bytes have been checked.

Before resetting the index to N, the patterns previously identified are replaced with a character representing the pattern. Subsequent compression on the remaining bytes of data therefore takes place without any further consideration of data previously identified as belonging to a pattern. This process trades off compression for processing time which is readily apparent when the data is decompressed. Typically this compression, although not taken to the mathematical limits of data compression, represents a compression ratio of at least five to one.

Figure 9:
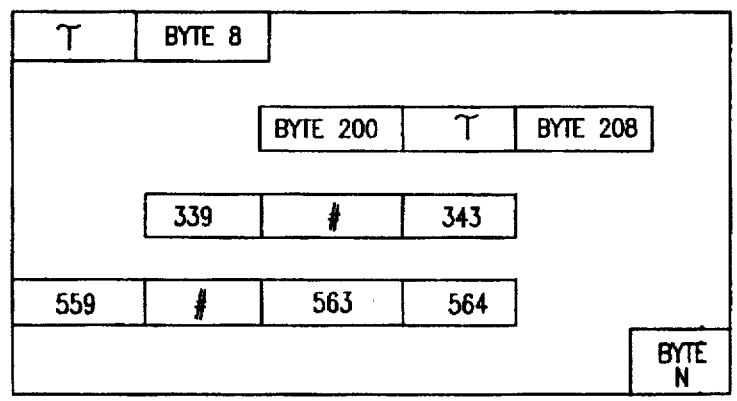
FIG. 9 illustrates the results of compressing the contents of the memory of FIG. 7.

FIG. 9 illustrates compressed data from a scenario where N was increased to 7, which resulted in bytes 1 through 7, 201 through 207 being equivalent to τ. Bytes 340 to 342 and 560 to 562 were replaced by # as they represent patterns of the first set when N equaled 3, and did not form part of the pattern created when N equalled 7.

The personal memory device 9 may be read at any time by using the same interface of FIG. 4. The flow of data from the personal memory device 9 to the computer for decompressing the data is shown in FIG. 10.

Figure 10:
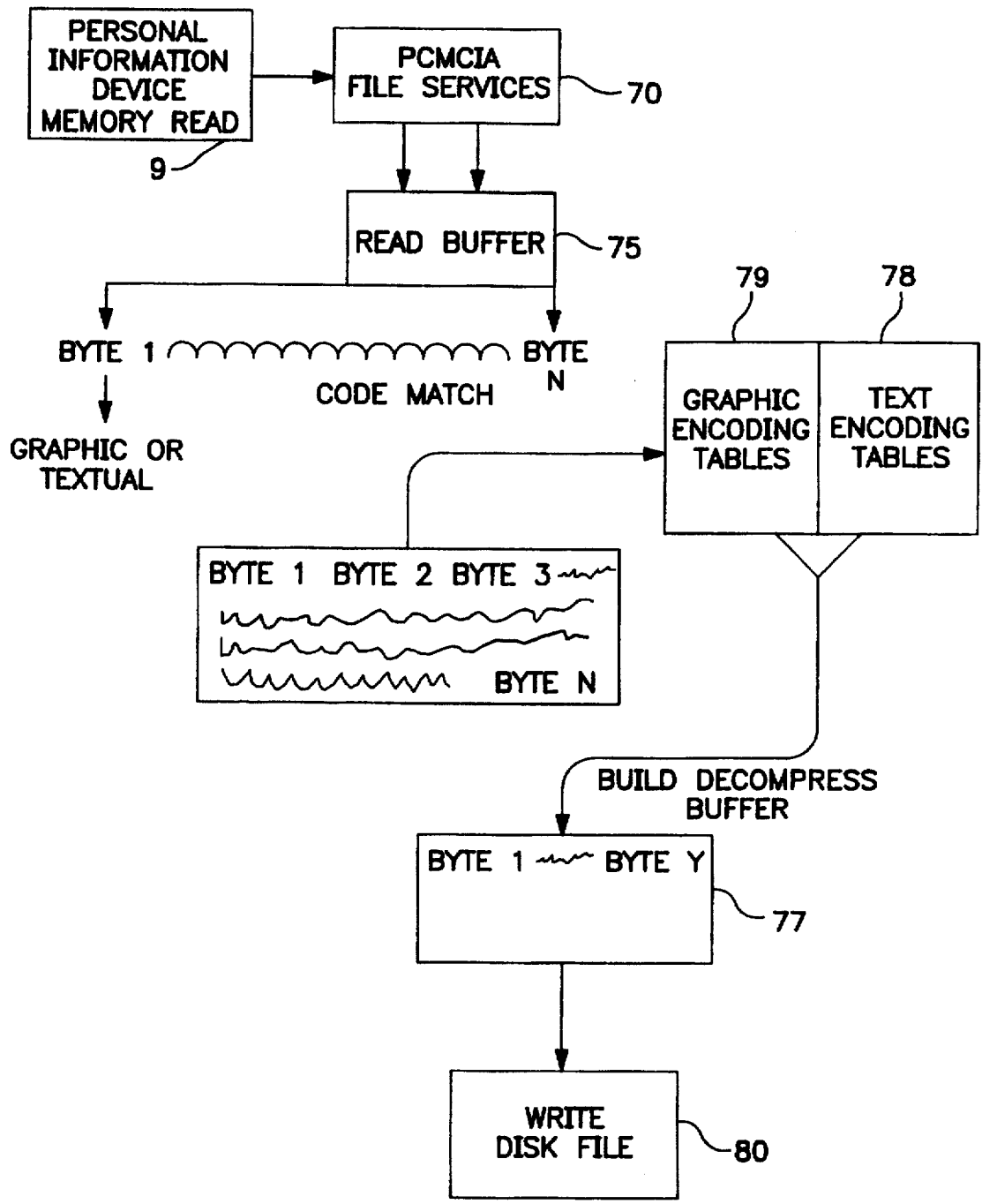
FIG. 10 illustrates the process for reading and decompressing data contained in the personal memory device.

Turning specifically to FIG. 10, the data contained in the personal memory device is accessed through the PCMCIA file services routine 70. The read buffer 75 within the computer which receives the data from the PCMCIA interface stores each received byte in sequence. Buffer 75 is checked in each byte position for any of the characters which were used to identify patterns during a compression routine. The encoding tables 78 and 79 containing characters representing various patterns compressed in the original data is consulted for each byte position. Where a character is found the character is replaced by the pattern of data represented by the character. The data obtained from the decompression process is written to the decompress buffer 77 and the computer disk file 80, constituting the original data before compression and decompression.

Figure 11:
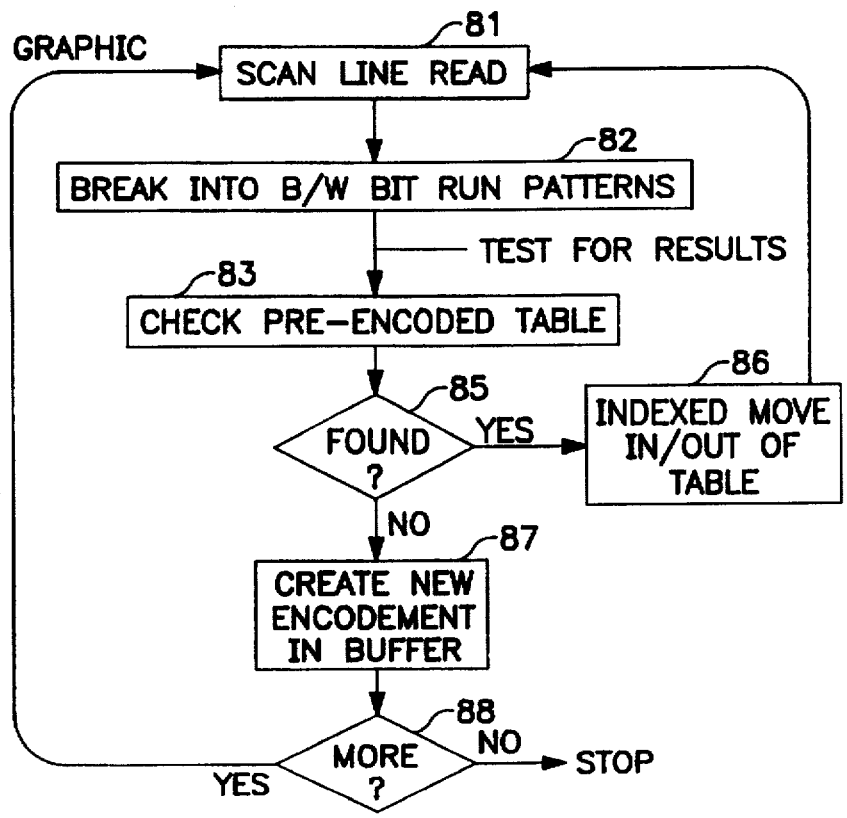
FIG. 11 illustrates the compression of graphic data stored in the mass storage device.
Figure 12:
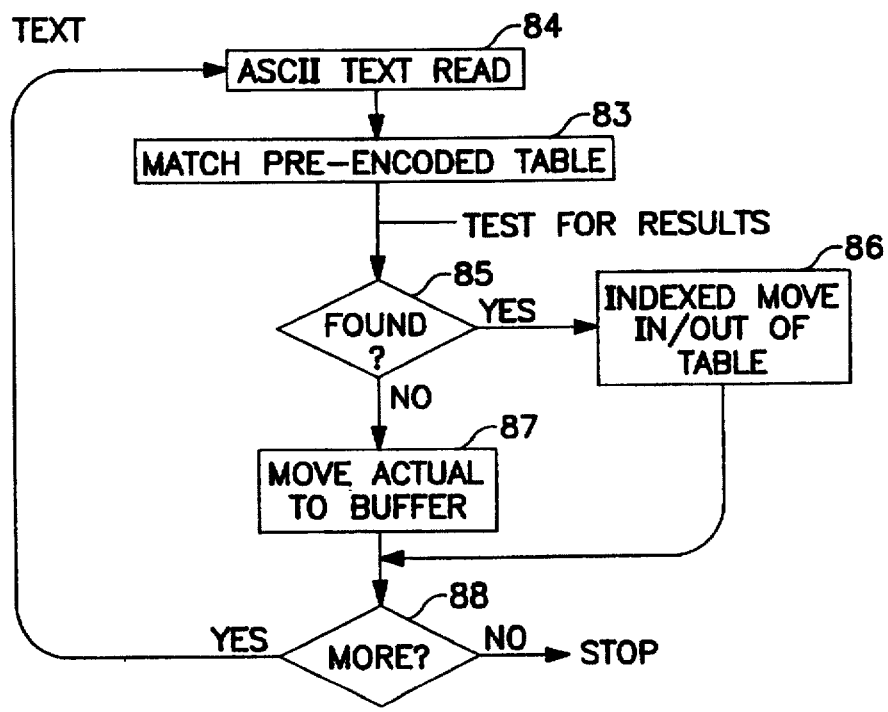
FIG. 12 illustrates the compression of text data read from the mass storage device.

The compression technique is further illustrated in a more general way in FIGS. 11 and 12. FIG. 11 illustrates the compression of graphic data retrieved from a personal memory device and FIG. 12 represents the compression of text data retrieved from the personal memory device. The steps for compressing each of the different data types is similar in many respects, and steps which are common to both compression schemes are illustrated by the same reference numeral in FIGS. 11 and 12.

In the graphic compression scheme, an entire scan line is read from the personal computer file in step 81. The scan line comprises series of bytes which represent pixels. The scan line is then broken into black/white, i.e., pixel, bit runs in step 82. Each of the bit runs is checked in step 83 for a prestored pattern if the pattern is found, it is replaced by a character in step 86.

When no match is found between the scan line and the pattern in the encoding memory, the process continues for another scan line. When all scan lines have been so processed, the compression ends.

The compression of text is performed similarly by reading an ASCII text file from the personal computer in step 84. The text is checked for a series of characters indicating a pattern of data bits in step 83. When a pattern is found in step 85, the entire pattern is replaced by a character in step 86 in the ASCII text buffer 84.

When no match is found, the bit pattern in the byte position remains unchanged in step 87.

When all byte positions have been checked, step 86 ends the compression process.

Thus, there has been described with respect to a preferred embodiment, a personal security device, as well as a method for compressing and decompressing data for storage in the personal memory device. Those skilled in the art will recognize yet other embodiments defined more particularly by the claims which follow.

What is claimed is:

1. A personal data storage device carried by an individual for storing information comprising:

a memory having a plurality of extending leads and which is encapsulated by an encapsulating compound having a high flexural modulus forming an environmentally secure enclosure for said memory, said encapsulating compound including a plurality of channels for enclosing said leads and which extend to the outside of said encapsulated memory forming a contact pattern to permit exterior contact with said leads; and a conductive sealant placed in said channels for sealing said channels of said encapsulated memory against moisture and extreme environmental conditions, forming a continuous surface with said encapsulating compound and for making electrical contact with said leads, providing external contacts for said memory which are identical with a contact pattern of an interface device with transfers data from said storage device.

2. The personal storage device of claim 1, wherein said personal data storage device includes a through hole in said encapsulating compound for securing said device.

3. The personal data storage device of claim 1, wherein said conductive sealant is a conductive epoxy resin.

4. The personal data storage device of claim 1, wherein said encapsulating compound is a urethane resin.

5. The personal data storage device of claim 1, wherein said encapsulating compound forming an enclosure for said memory includes along a peripheral edge a sealed hole for receiving a necklace worn by a user of said device.

6. A personal data storage device carried by an individual comprising:

a memory having a plurality of exterior contacts;

an encapsulating urethane resin compound having a high flexural modulus enclosing said memory forming an environmentally secure enclosure, said encapsulating compound including a plurality of channels which communicate with said exterior contacts forming a contact pattern; and a conductive sealant filling said channels forming a sealed surface with said encapsulating compound, making an electrical connection with said contacts as well as sealing said memory and its exterior contacts against moisture and extreme environmental conditions, said conductive sealant forming external contacts identical with a contact pattern of an interface device which transfers data from said memory.

7. The personal storage device according to claim 6 wherein said conductive sealant forms with said encapsulating compound a continuous surface.

8. The personal data storage device according to claim 6 wherein said external contacts are adapted to mate with an interface which includes a plurality of spring biased contacts which connect to a computer.

9. The personal data storage device of claim 6 wherein said memory is a flash memory.

* * * * *